US008027915B2

(12) United States Patent
Koningstein et al.

(10) Patent No.: US 8,027,915 B2
(45) Date of Patent: Sep. 27, 2011

(54) FLEXIBLE ADVERTISER BILLING SYSTEM WITH MIXED POSTPAYMENT AND PREPAYMENT CAPABILITIES

(75) Inventors: Ross Koningstein, Menlo Park, CA (US); Saksiri Tanphaichitr, Sunnyvale, CA (US); Vikas Sukla, Santa Clara, CA (US); Michael Schulman, San Francisco, CA (US); Giles Douglas, Mountain View, CA (US); Emmett Andrew Cunningham, Brisbane, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 12/851,902

(22) Filed: Aug. 6, 2010

(65) Prior Publication Data

US 2010/0324998 A1   Dec. 23, 2010

Related U.S. Application Data

(62) Division of application No. 11/743,573, filed on May 2, 2007, now Pat. No. 7,792,743.

(51) Int. Cl.
*G06Q 40/00* (2006.01)
(52) U.S. Cl. ................ 705/38; 705/35; 705/40
(58) Field of Classification Search .............. 705/38, 705/40, 35
See application file for complete search history.

(56) References Cited

U.S. PATENT DOCUMENTS

| | | | |
|---|---|---|---|
| 7,209,895 B2 | 4/2007 | Kundtz et al. | |
| 7,319,972 B2 | 1/2008 | von Gonten et al. | |
| 7,340,433 B1 | 3/2008 | Kay et al. | |
| 7,383,215 B1 | 6/2008 | Navarro et al. | |
| 7,792,743 B2 | 9/2010 | Koningstein et al. | |
| 2002/0194096 A1 | 12/2002 | Falcone et al. | |
| 2002/0194122 A1 | 12/2002 | Knox et al. | |
| 2003/0120591 A1 | 6/2003 | Birkhead et al. | |
| 2003/0187765 A1* | 10/2003 | Sgaraglio | 705/35 |
| 2004/0243510 A1 | 12/2004 | Hinderer et al. | |
| 2005/0080718 A1* | 4/2005 | Desai | 705/38 |
| 2005/0256747 A1* | 11/2005 | Hellrigel | 705/4 |
| 2006/0206355 A1* | 9/2006 | Cheung et al. | 705/1 |
| 2006/0213975 A1 | 9/2006 | Krishnan et al. | |
| 2007/0094114 A1 | 4/2007 | Bufford et al. | |

(Continued)

FOREIGN PATENT DOCUMENTS

WO    WO 2006/125274    11/2006

OTHER PUBLICATIONS

Business Sale : terms and conditions at web.archive.org/"/http://www.business-sale.us/terms.shtml—3 pagesequinoxin.*

(Continued)

*Primary Examiner* — Shahid R Merchant
*Assistant Examiner* — Mary Gregg
(74) *Attorney, Agent, or Firm* — Sterne, Kessler, Goldstein & Fox P.L.L.C.

(57) ABSTRACT

A computer-implemented method of providing advertising to a client includes establishing a billing experience between a client and a provider, providing advertising opportunities to the client on at least one of a continual basis and a periodic basis, evaluating a credit risk associated with the client at least one of periodically and upon occurrence of an event, and modifying the billing experience automatically based on the credit risk associated with the client.

11 Claims, 9 Drawing Sheets

U.S. PATENT DOCUMENTS

| | | | |
|---|---|---|---|
| 2007/0288375 | A1 | 12/2007 | Talbert et al. |
| 2008/0120218 | A1 | 5/2008 | Reid et al. |
| 2008/0154668 | A1* | 6/2008 | Kuo et al. .................... 705/7 |
| 2008/0154758 | A1* | 6/2008 | Schattmaier et al. ........... 705/35 |
| 2008/0172401 | A1 | 7/2008 | Nishiyama |

OTHER PUBLICATIONS

Equinoxinstant credit agreement Relail installment credit agreement 5 pages.*

US Court of Appeals, First Circuit No. 05-1631 9 pages.*

Written Opinion of the International Searching Authority cited in International application No. PCT/US2008/005591, International filing date May 1, 2008, 4 pages.

International Search Report cited in International application No. PCT/US2008/005591, International filing date May 1, 2008, 3 pages.

European Search Report cited in Application No. 08251274.0-2211 / 1988501 dated Apr. 21, 2009.

"Internet Merchants Fight as Costs of Fraud Mount" by Michael Rubinkam: Associated Press: Apr. 17, 2006; Business & Technology; web.archive.org/web20060421093617/http://seattletimes.nwsource.com/html/businesstechnology/2002934579_btnetfraud17.html—5 pages.

"Is Your Cost-Per-Click Advertising Actually Profitable?" by Glen Hamilton—5 pages: MarketingProfs.com: http://mercent.com/NewsArticles/2006-03-07%20-%20MarketingProfs.com—Mar. 7, 2006.

"Internet Billing" by Brian Piccolo: Aug. 2003—www.pixelbridge.com/articles/index.php?p=32—3 pages.

"A Quick and Easy Guide to Online Banking and Bill Payer" by Paul A Murphy, author of Banking Online for Dummies: Published by Murphy and Company, Inc. 2004-2006, www.mcompany.com—18 pages.

"Customer Acquisition Costs Demystified" by John Snchez at www.zunch.com/whitepapers_papers.cfm 2005—4 pages.

"Understanding and Controlling Cash Flow" by Ramin C. Maysami: SBA programs; 31 pages from Appendix C of "How to Write a Business Plan." Copyright 1990.

"State Denies Part of Loan requested by School District Revenue Officials Vow Close Scrutiny" by Peter Schworm, Globe Staff ; The Boston Globe. New York Times Company NY, NJ, DC, TX and Intl Addresses—May 21, 2002.

VitalStream Holding Inc; Edgar Online; Nov. 16, 2006; 12 pages.

U Bows Tiral Service for Music Downloads by Jultin Oppelaar; p. 6; Oct. 24, 2000; Daily Variety.

Interactive: New Juno Ad Model Offers Targeting Options by Patricia Riedman; Advertising Age; Jul. 7, 1997.

* cited by examiner

FLEXIBLE ADVERTISER BILLING SYSTEM WITH MIXED POSTPAYMENT AND PREPAYMENT CAPABILITIES

CROSS-REFERENCE TO RELATED APPLICATIONS

This application is a divisional of U.S. Non-Provisional application Ser. No. 11/743,573, filed May 2, 2007, now U.S. Pat. No. 7,792,743, issued Sep. 7, 2010, which is incorporated by reference herein in its entirety.

BACKGROUND

1. Field

The present invention relates to billing clients for products and services.

2. Background Art

For business transactions ranging in complexity from buying an item in a supermarket to buying a large property, different methods of billing a client have been developed. Some methods require the client to allocate funds to purchase the product before the product is received. Other methods require the provider to assume a substantial risk that the client will not pay for the product after receiving it. Although the methods of billing are typically chosen to be optimal for a particular type of transaction, the chosen billing methods often become inconvenient to client and/or the provider. Such billing methods typically remain static over the course of all transactions between the consumer and provider, and thus do not adapt to changing conditions between the consumer and provider.

Thus, what is needed is a method of billing that can adapt to changing conditions between a client and provider.

SUMMARY

In one embodiment, a computer-implemented method of providing advertising to a client includes establishing a billing experience between a client and a provider, providing advertising opportunities to the client on at least one of a continual basis and a periodic basis, evaluating a credit risk associated with the client at least one of periodically and upon occurrence of an event, and modifying the billing experience automatically based on the credit risk associated with the client.

In another embodiment, a computer-implemented method of providing advertising to a client is provided. The method includes establishing a billing experience between a client and a provider, an account being subject to the billing experience having a credit line, evaluating a credit risk associated with the client at least one of periodically or upon occurrence of an event, modifying the billing experience based on the credit risk associated with the client, the billing experience being changed to one of the following billing experiences: a prepay billing experience, a partial prepay partial postpay billing experience, a threshold billing experience, or an end-of-team billing experience, providing advertising opportunities to the client on at least one of a continual basis or periodic basis, based on at least one of funds in the account, the credit line of the account, or the credit risk associated with the client, and billing the client for the advertising opportunities in a manner determined by the modified billing experience.

In yet another embodiment a system for providing advertising opportunities from a provider to a client is provided. The system includes an advertisement database that stores an advertisement of the client, a risk evaluation server that calculates a credit risk associated with the client based on at least one of a performance of the product of the client, a transaction history between the client and the provider, or a credit performance of the client, a billing server that changes, based on the calculated credit risk, a billing experience between the provider and the client to one of the following billing experiences: a prepay billing experience, a partial prepay partial postpay billing experience, a threshold billing experience, or an end-of-term billing experience, the billing server further billing the client at a time determined by the billing experience, and an advertisement supply server that displays the advertisement of the client at a rate determined by at least one of the billing experience between the provider and the client or the credit risk associated with the client.

Further embodiments, features, and advantages of the invention, as well as the structure and operation of the various embodiments of the invention are described in detail below with reference to accompanying drawings.

BRIEF DESCRIPTION OF THE FIGURES

Embodiments of the invention are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION OF EMBODIMENTS

Figure 1:
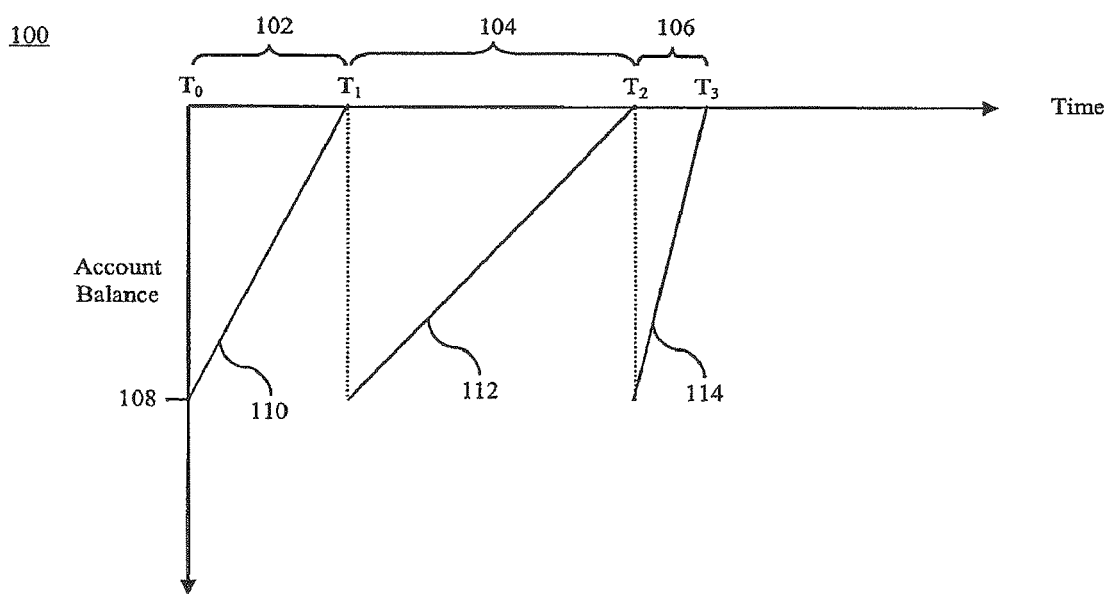
FIG. 1 is a graph illustrating a pre-pay billing arrangement.

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

INTRODUCTION

Embodiments described herein refer to transactions between a client and a provider. A client, as described herein, may be a business, consumer, or group of businesses and/or consumers. The provider provides products to the client. As would be apparent to those skilled in the relevant art(s), products are not limited to physical goods. Rather, products may also include services or a combination of goods and services. Moreover, the provider may also provide a flow or stream of products. For example, the client may be a retailer and the provider may be an Internet advertisement server. In such an embodiment, the advertisement server may post advertisements that promote the retailer on an ongoing (e.g., continual and/or periodic) basis. In another example, the client may be a retailer and the provider may be a radio or video advertisement server. In such an embodiment, the advertisement server may deliver advertisements based on an order of the retailer. Alternatively or additionally, the provider may provide items that the retailer sells to customers. Often, the provider determines a suitable billing arrangement by which the provider bills for and eventually receives payment for the products it provides.

In describing different billing arrangements it is helpful to define deposit requirements and predictability of billing as measures of resource availability for the client and credit extended by the provider. Deposit requirements for different billing arrangements refer to funds that must be deposited with the provider before the desired products are provided to the client. Predictability of billing refers to how predictably (from the client's point of view) the provider bills the client.

As the deposit requirement of a billing arrangement increases, more and more of the client's resources are allocated to products before the benefit of the products is realized. Conversely, as the deposit requirement falls, more credit is extended by the provider and losses associated with a client who fails to pay increase.

As the predictability of billing increases, the client is benefited by being able to better budget for products provided. However, predictability of billing also results in greater risk for the provider because the client may run costs above what they can afford because there is no control in place to limit the client prior to being billed.

It is important to note, however, that the provider does have an interest in increasing resource availability for the client. First, resource availability may influence a client's decision in deciding between competing providers. Moreover, increased resource availability may also result in an increase in the client's demand for products thereby generating additional revenue for the provider. Thus, in deciding between billing arrangements, the provider must weigh the potential for increased revenue against the risk assumed.

In a pre-pay billing arrangement, the client is required to deposit a certain amount of funds before the provider begins to provide the desired products. As the provider delivers the desired products the amount of the client deposit is reduced. Once the deposit is fully exhausted (or reaches another predetermined minimum), the provider bills the client or notifies the client that the client needs to make a payment. The provider does not start providing the desired products again until the client deposit returns to a predetermined level. FIG. 1 shows a graph 100 illustrating an account balance in a pre-pay billing arrangement, according to an embodiment of the present invention.

FIG. 1 shows time periods 102, 104, and 106 representing time periods from $T_0$ to $T_1$, from $T_1$ to $T_2$, and from $T_2$ to $T_3$, respectively. Waveforms 110, 112, and 114 represent the account balance of the client over time periods 102, 104, and 106, respectively. An account balance, as defined herein, refers to the funds that are owed to the provider from the client. Therefore, as shown in FIG. 1, the client has always has an account balance equal to or below zero, since the client is forced to deposit funds in a pre-pay billing arrangement.

As shown in FIG. 1, the client has an account balance 108 at time $T_0$. The deposit represented by account balance 108 may be the minimum deposit required before the provider begins to provide the desired flow of products. As shown by waveform 110, at the end of time period 102 (i.e., time $T_1$), the client deposit is fully exhausted and the provider bills the client so that the account balance again reaches balance 108. As shown by FIG. 1, such a process generally repeats over time periods 104 and 106.

Also as shown in FIG. 1, time periods 102, 104, and 106 are substantially different. Thus, the client cannot predict when it will be billed by the provider. Moreover, the client must also have a deposit with the provider before the product flow is received. Thus, the pre-pay system is a system that constricts resource availability on the part of the client. Moreover, since funds are deposited with the provider before any products are supplied, in the pre-pay system no credit is extended by the provider and the client must bear the burden of reduced availability of funds.

In a credit threshold or post-pay billing arrangement, the provider bills the client once the account balance of the client (i.e., the amount owed by the client to the provider) reaches or nears (within a predetermined range) a credit line. This credit line may stay constant or change over time.

Figure 2:
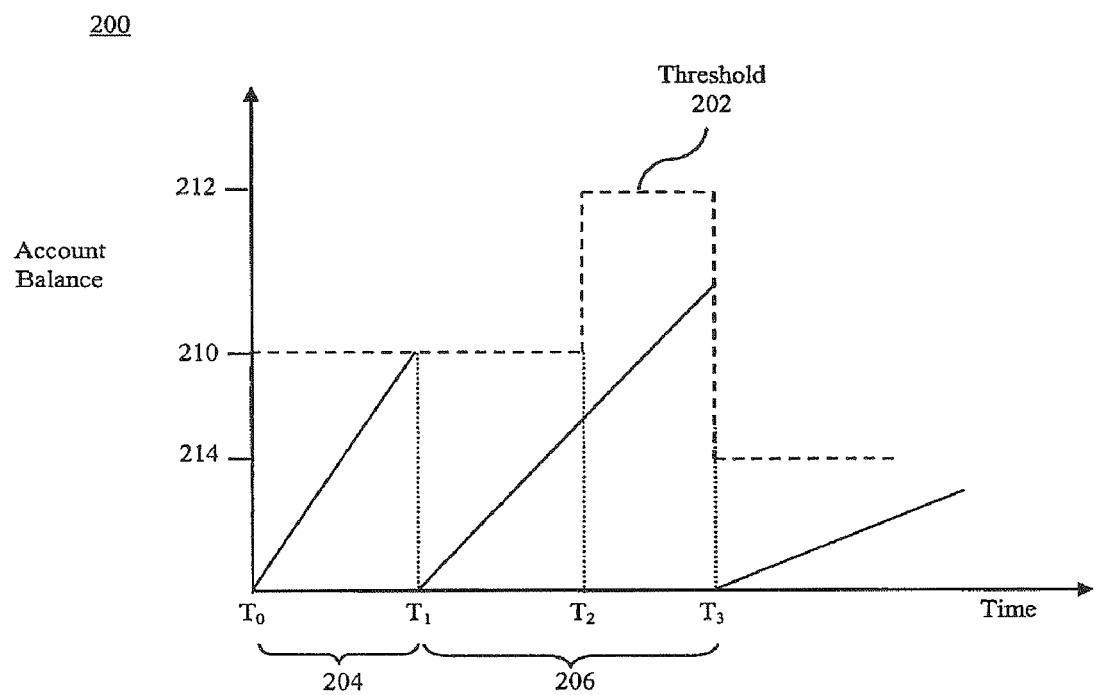
FIG. 2 is a graph illustrating a post-pay billing arrangement.

FIG. 2 shows graph 200 illustrating an account balance in a post-pay or credit threshold billing arrangement, according to an embodiment of the present invention. FIG. 2 shows time periods 204 and 206 representing time periods from $T_0$ to $T_1$ and from $T_1$ to $T_3$, respectively. In the post-pay billing arrangement, the client is billed once the client account balance reaches a credit line. In contrast to the pre-pay billing arrangement described above, an account balance in a post-pay billing arrangement is always greater than or equal to zero. FIG. 2 also shows a credit line 202, and account balances 210, 212, and 214. As shown in FIG. 2, credit line 202 changes over time from balance 210, to balance 212, and finally to balance 214.

As the account balance of the client rises, account balance 210 is reached at time $T_1$. Since credit line 202 is set at account balance 210, the client is billed at this point. After providing payment for the account balance at time $T_1$, the client again begins to develop an account balance with the provider. At time $T_2$, credit line 202 is increased to account balance 212, allowing the client to accrue a balance larger than account balance 210 which it was billed for at $T_1$. At time $T_3$, credit line 202 is reduced to account balance 214. Since the account balance of the client at time $T_3$ is greater than balance 214, the client is billed at time $T_3$.

Credit line 202 is unpredictable from the point of view the client, both in terms of the times at which credit line 202 will transition and of the account balance to which credit line 202 will transition. Similar to the pre-pay billing arrangement, then, the client does not know when a payment will be required from the provider. In contrast to the pre-pay billing arrangement, however, the client does not have funds allocated to products before the provider provides the desired products. Thus, the post-pay billing arrangement allows the client greater resource availability since funds are taken from the client after the desired products are provided.

From the provider's perspective, the post-pay billing arrangement results in an increased credit risk extended to the client over the pre-pay billing arrangement. By granting the client the ability to receive products before paying for them, the provider assumes a greater risk that the client will not pay for the products provided. However, the provider limits its risk by changing the credit line in accordance with a risk associated with a client, so that a suspected risky client will not be given the opportunity to run up a balance higher than the client can afford to pay.

A pre-pay billing arrangement may be viewed as a special case of the credit threshold or post-pay billing arrangement in which the credit line is set to zero. In such a pre-pay billing arrangement, to ensure that the amount deposited with the provider will cover the demand for products, the provider often places a portion of the deposited funds in a budget used to account for an unexpectedly large demand. If the budget is not exhausted, the budget may be carried over to the next deposit by the client. In alternate pre-pay embodiments, the provider may instead extend the client a limited credit in the case of an unexpectedly large demand.

In an end-of-term billing arrangement, the provider extends the client a line of credit and bills the client at predictable times. For example, the provider may extend the client a line of credit in which products are provided for a predictable time period (e.g., a month) and bill the client at the end of the time period.

Figure 3:
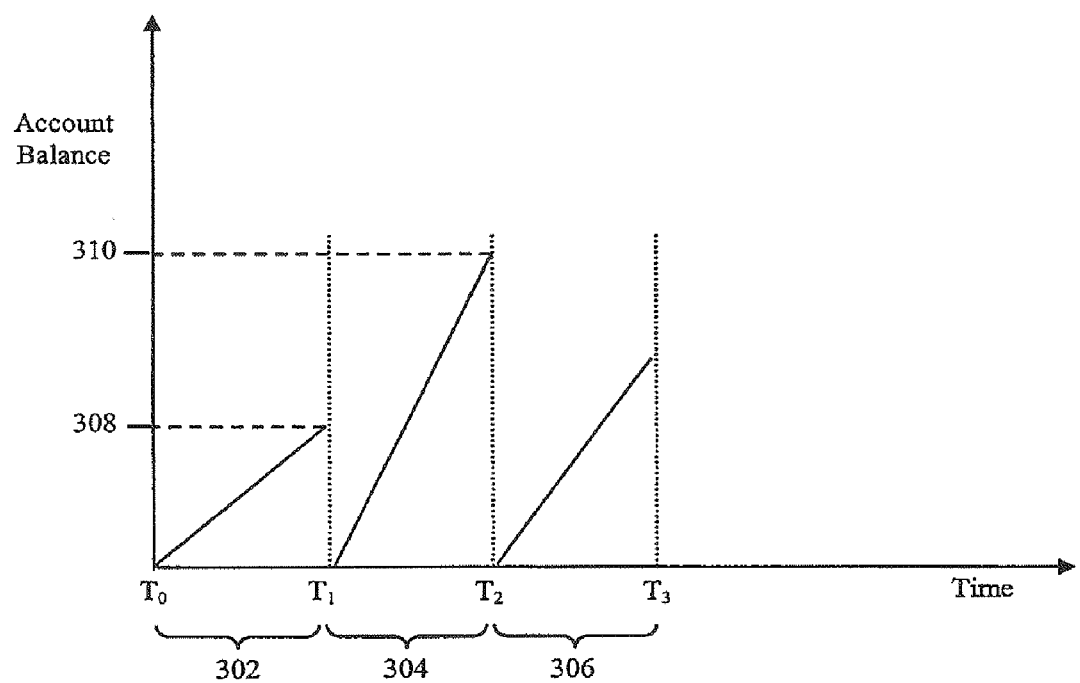
FIG. 3 is a graph illustrating an end-of-term or periodic billing arrangement.

FIG. 3 shows an exemplary graph 300 illustrating an end-of-term billing arrangement. Graph 300 shows time periods 302, 304, and 306 representing time periods from $T_0$ to $T_1$, from $T_1$ to $T_2$, and from $T_2$ to $T_3$, respectively. In an embodiment, the provider bills the client at times $T_1$, $T_2$, and $T_3$. In a further embodiment, time periods 302, 304, and 306 are substantially equal. At time $T_1$, the client has accrued an account balance 308 and is billed accordingly. At time $T_2$, the client has billed an account balance 310 and also is billed accordingly. As shown in FIG. 3, account balance 310 is substantially larger than account balance 308. Thus, the account balance does not affect when the client will be billed and the client can predict, based solely on the time since the last billing, when the provider will bill for products provided.

The end-of-term billing arrangement provides a greater degree of resource availability for the client. The end-of-term billing arrangement does not require the client to allocate funds to before products are delivered and the times at which the provider will bill the client are completely predictable.

However, in the end-of-term billing arrangement the provider extends a relatively high amount of credit. Further, since the provider provides products before receiving payment from the client, the client may not know the exact balance of the account or how much the client will be asked to pay at the end of the billing term.

Thus, the pre-pay, post-pay, and end-of-term are billing arrangements that involve different amounts of credit extended to the client, and thus different amounts of risk assumed by the provider. In the pre-pay billing arrangement, the provider extends little or no credit to the client. In the post-pay billing arrangement, the provider extends a limited amount of credit to the client and may change that limit unpredictably over time. In the end-of-team billing arrangement, the provider potentially extends the client an unlimited amount of credit and bills the client at the end of predictable time periods.

In conventional transactions with a client, a provider often decides to use one of the three different billing arrangements described above and keeps that arrangement throughout all transactions with the client. In embodiments described herein, however, billing parameters are updated as conditions change.

A billing experience includes various billing parameters that affect the interaction between a client and a provider. Billing parameters include, for example and without limitation, the credit line extended to the client, the frequency of billing, the cost of goods sold, and an outstanding order limit (for example, for radio or video advertisements, as will be described further below). In an embodiment, billing parameters of a billing experience are updated based on a credit risk associated with a client.

A client, as described above, may be a group of consumers and/or businesses, as well as a single consumer or business. More specifically, the group of consumers and/or businesses is considered a client if its members have correlated risk. In other words, a risk associated with a member of the client may be indicative of a risk associated with other members of the client and of the client as a whole. In evaluating the risk associated with a multi-member client, then, the risk may be calculated based on observations of the client as a whole as well as each individual member. Thus, a single credit account may be established for the client, rather than individual accounts for each member. For example, a single contact may be responsible for payments made to the provider on behalf of multiple businesses. The multiple businesses are, in this scenario, grouped into a single client since risk of the contact for one of the businesses is indicative of risk of the contact for another of the businesses.

The risk associated with a client may be determined through the use of a conventional credit check. However, conducting credit checks on clients is often costly and not time efficient. This is especially an issue when clients interact with the provider over the Internet, as automated requesting of a credit check is not typically an option. Moreover, dynamically updating the risk associated with a client may result in additional delays and costs.

Alternatively, the risk associated with a client may be determined by the provider itself. Such a provider may make observations such as, for example and without limitation, a comparison between long term and short term demand for products, the presence of a guaranteed form of payment, the net present value of having a future supply of product to a client, and a payment history of the client. If there is a dramatic shift in recent demand for products, that may indicate that the client is unstable and therefore is a high risk. The presence of a guaranteed form of payment (i.e., a form of payment that may be accessed by the provider if the client delays payment or does not pay) decreases the risk associated with the client. Examples of forms of guaranteed payment include but are not limited to credit cards, bank accounts, and cash balances. The payment history of a client relates to how quickly the client pays bills from the provider. As the delay between bills and actual payment increases, the risk associated with the client also increases.

Risk evaluations may be automated such that the various criteria used to evaluate risk are observed periodically. Additionally or alternatively, risk evaluations may be event-based. For example, if the client releases a new item to be marketed to consumers, an event based risk evaluation may be executed. Generally, many different types of events may be used to trigger risk evaluation including but not limited to events relating to micro- and/or macro-economic events. For instance, events that trigger risk evaluation may be specific to the client (such as, release of an earning report, stock price change, bankruptcy event, etc.) specific to an industry of the client (such as, economic data indicating the performance of an industry), and/or specific to an economy generally (such as, stock exchange indices, government economic data, etc.). As would be apparent to persons skilled in the relevant art(s), risk evaluations can be partially or wholly implemented using software, firmware, hardware, or any combination thereof.

The results of risk evaluations may lead to updates in billing parameters in the billing experience between the provider and the client. For example, a cost of goods sold may be updated based on the results of a risk evaluation. In adjusting the cost of goods sold, a reliable (e.g., low risk) client is given access to products that are more expensive to produce, but are also more profitable to the provider. Such products are assumed to be desired by the client. The access to high cost goods may be limited to a high risk client, since it is less likely that they will pay for the goods, which would result in increased losses for the provider compared to lower cost goods. For example, in transactions with a reliable retailer, an advertisement server may allow for syndicated advertisements, video advertisements, and/or print advertisements that have a high cost of goods sold as compared to online advertisements having a low cost of goods sold, as would be appreciated by those skilled in the relevant art(s).

The credit line that the provider is willing to extend to a client may be increased or decreased based on the evaluated risk associated with the client. The frequency of ad hoc billing may be adjusted based on risk evaluations. For a high risk client, billing frequency may be increased to protect the provider from losses. Elements of the pre-pay, post-pay and end-of-term billing arrangements may be combined to a form a flexible billing experience, according to an embodiment of the present invention. The operation of a flexible billing experience is described with reference to FIG. 4.

Figure 4:
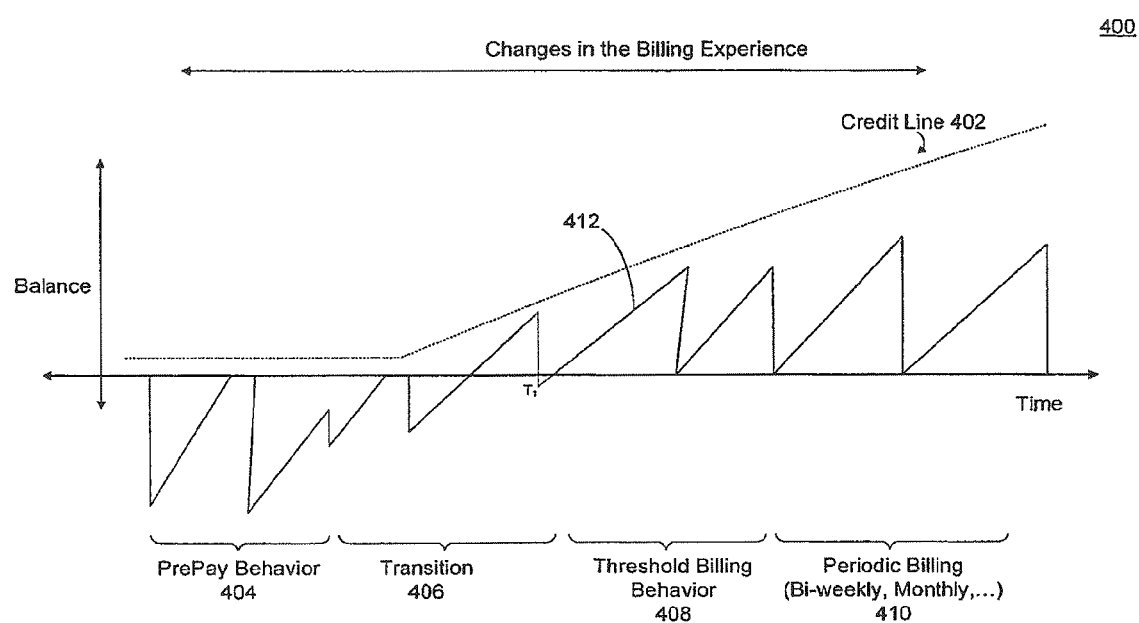
FIGS. 4-5 are graphs illustrating changes in billing experiences, according to embodiments of the present invention.

FIG. 4 shows an exemplary graph 400 showing the account balance of a client as the client and provider conduct business in a flexible billing experience. Graph 400 includes a credit line 402, time periods 404, 406, 408, and 410, and a waveform 412. Waveform 412 is a waveform that is representative of the client's account balance. The flexible billing experience is described with reference to an embodiment in which the client is a retailer and the provider is an Internet advertisement server. However, as would be apparent to those skilled in the relevant art(s), such a billing experience may also be implemented in other fields in which the provider provides a flow of products to a client such as the supply of medicine to a pharmacy, fuel to an airline, etc. In the embodiment of FIG. 4, changes in billing parameters result from the outcomes of periodic and/or event-based evaluations of risk associated with the retailer.

During time period 404, the billing experience of the retailer exhibits a pre-pay behavior generally similar to the pre-pay billing arrangement as described with reference to FIG. 1. In an embodiment, the retailer is relatively new to the advertisement server and has not yet earned credit with the advertisement server. Alternatively, the retailer may have been designated as having a relatively high credit risk by the advertisement server. As described above, a pre-pay arrangement involves little or no credit being extended to the retailer. As shown in FIG. 4, credit line 402 is substantially zero throughout time period 404 indicating that the advertisement server is not extending credit to the retailer. During time period 404, the advertisement server also evaluates a credit risk associated with the retailer. At the end of time period 404, the advertisement server determines that the retailer merits an increase in credit.

Thus, in time period 406, the billing experience of the retailer exhibits a partial pre-pay partial post-pay behavior. As such, the retailer may be billed once the account balance reaches zero, but may also be allowed to accrue a positive account balance. As shown in FIG. 4, credit line 402 begins to increase in time period 406 indicative of the credit the advertisement server extends to the retailer. However, even as the retailer is granted credit, the billing experience in time 406 may exhibit some pre-pay behavior. For example, at time $T_1$, the retailer is billed so that the account balance again becomes negative (i.e., an amount greater than the account balance) similar to a pre-pay arrangement.

Alternatively, even if the retailer is not specifically billed at time $T_1$, the negative balance may result from an ad hoc payment made by the retailer that is greater than the account balance. Such a payment may be made before the account balance reaches the credit line. Such a payment provides flexibility to the retailer as to when and how much the retailer pays, as a negative balance effectively extends the length of time (if all other parameters stay equal) until a next payment is due. Although not specifically illustrated in FIG. 4, the retailer may make ad hoc payments in a similar manner during each of the different time periods 404, 408, and 410 of the billing experience.

At the end of period 406, the advertisement server decides to offer an increased amount of credit to the retailer. Thus, in time period 408, the billing experience exhibits a post-pay or credit threshold billing behavior. The retailer is billed every time the account balance reaches credit line 402. Moreover, credit line 402 increases throughout time period 406, indicating that the advertisement server is changing the billing parameters by extending an increasing amount of credit to the retailer. Although FIG. 4 shows credit line 402 increasing generally monotonically during time period 406, credit line 402 may also change unpredictably similar to credit line 202 in FIG. 2 but still have a generally increasing trend.

At the start of time period 410, the billing experience of the retailer exhibits an end-of-term behavior. As shown by FIG. 4, the advertisement server bills the retailer at predictable times such as, for example, the end of every month. However, the billing experience during time period is 410 is not a pure end-of-term billing arrangement as described with reference to FIG. 3. Unlike an end-of-term billing arrangement, the billing experience in time period 410 still includes credit line 402. Credit line 402 increases as time period 410 goes on. Thus, as time goes on and the risk evaluations indicate the client is reliable, credit line 402 becomes larger, and thereby decreasingly relevant, and the billing experience moves closer to a pure end-of-term billing arrangement. The length of the term for the end-of-term billing experience may also be increased as the credit risk of the retailer decreases.

The embodiment of FIG. 4 shows the account balance of a retailer as the retailer and advertisement server experience distinct transitions in their billing experience. The billing experience transitions from exhibiting behavior consistent with a retailer that has little or no credit to a billing experience consistent with a retailer that has a relatively high credit with the advertisement server. Additionally or alternatively, the advertisement server may, as described above, also gradually update billing parameters of the billing experience other than the credit line. For example, within time period 404, the advertisement server may decrease the minimum deposit required to serve the advertisements of the retailer. Moreover, in transitional time period 406 (i.e., the partial pre-pay partial post-pay portion), the advertisement server may adjust how quickly credit line 402 increases. Thus, the flexible billing experience illustrated in FIG. 4 may be viewed as a series of gradual changes in the parameters of the billing experience between the retailer and the advertisement server that result from risk evaluations.

Figure 9:
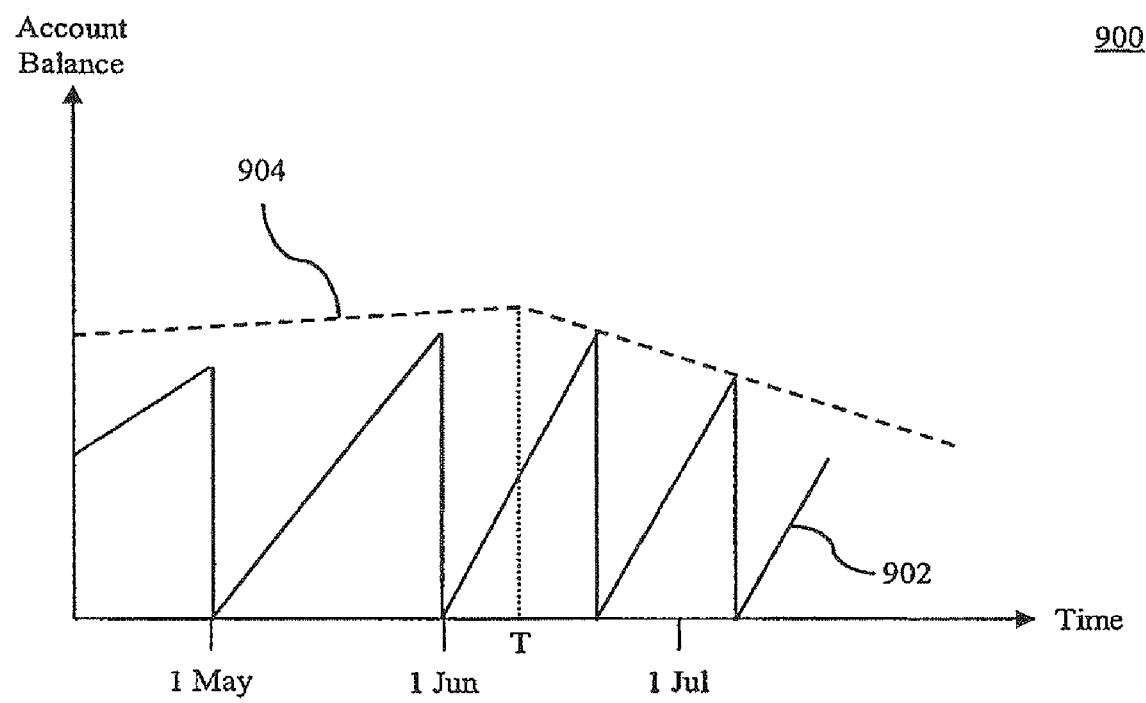
FIG. 9 is a graph illustrating a change in billing experience, according to an embodiment of the present invention.

As would be appreciated by those skilled in the relevant art(s), periodic risk evaluations may also be used to gradually decrease credit associated with a client that demonstrates high risk. FIG. 9 shows an exemplary graph 900 showing the account balance of a client as the client and provider conduct business in a flexible billing experience, wherein the credit associated with the client decreases. As illustrated by account balance 902, the billing experience initially exhibits an end-of-term behavior. At the same time, credit line 904 is gradually increasing. At time T, however, the client begins to demonstrate high risk. Accordingly, the credit line in this example begins to decrease in value. As illustrated in FIG. 9, the billing experience may also change as the credit line decreases. For example, the billing experience may transition from an end-of-term behavior to a post-pay behavior.

Figure 5:
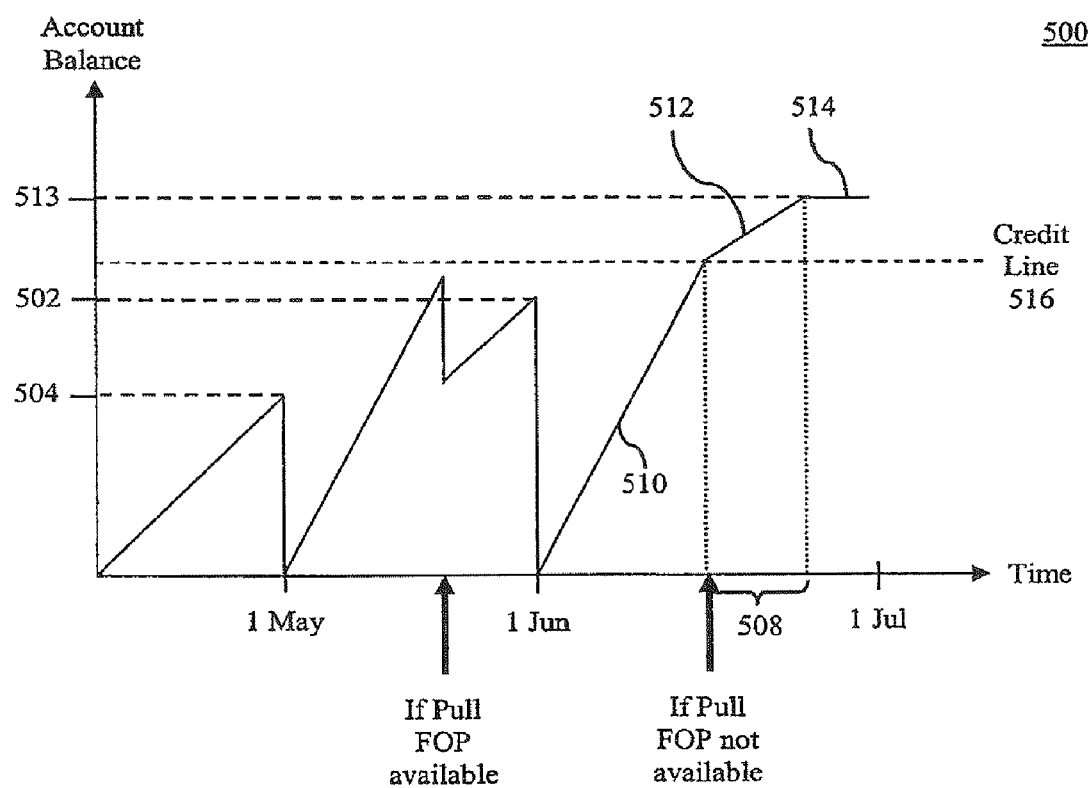

Returning to FIG. 4, the flexible billing experience described with respect to FIG. 4 manages risk to the provider while providing a positive experience to the client. Other forms of risk management may also be used as an alternative or in addition to the flexible billing experience described with respect to FIG. 4. Some of these forms of risk management are illustrated in FIG. 5. FIG. 5 is described with respect to an embodiment where the client is a retailer and the provider is an Internet advertisement server. However, one of skill in the relevant art(s) will recognize that the description applies to other client/provider arrangements without departing from the spirit and scope of the present invention.

FIG. 5 shows an exemplary graph 500 illustrating an account balance of the retailer as the advertisement server manages a risk associated with transactions with the retailer. As shown in FIG. 5, the retailer is billed for an account balance 504 on May 1. Account balance 504 is below credit line 516. However, between May 1 and June 1, the account balance of the client reaches a threshold at or near credit line 516. In response, the advertisement server executes an off-cycle or ad hoc payment request. As shown in FIG. 5, instead of waiting until the end of the billing period, the advertisement server bills the retailer once the account balance reaches credit line 516. If a guaranteed form of payment is available, the provider collects the outstanding balance or a portion thereof from the guaranteed form of payment, and the account balance is reduced. As shown in FIG. 5, as result of the ad hoc bill, the account balance is reduced to an account balance below credit line 516 and the risk of non-payment to the advertisement server is reduced. In an embodiment, the threshold is equal to the credit line. In another embodiment, the threshold is slightly below the credit line, so as to allow for charge declines. In this embodiment, a grace period exists between the threshold and the credit line, and serving can continue during the grace period to allow for automatic credit card retry and/or a request for the customer to make an ad hoc payment.

On June 1, the retailer is billed in the predictable manner for an account balance 502. Between June 1 and July 1, the account balance of the retailer again reaches credit line 516. However, in this case, a guaranteed form of payment is not available when the advertisement server attempts an ad hoc billing and the account balance of the retailer is not reduced. In response, the advertisement server may throttle the advertisements of the retailer. In throttling the advertisements of the retailer, the advertisement server decreases the rate at which the advertisements of the retailer are served. As shown in FIG. 5, the slope of waveform 510 (i.e., the account balance before the credit limit threshold is reached) is greater than the slope of waveform 512 (i.e., the account balance after the credit limit threshold is reached) illustrating that the rate at which the advertisements of the retailer are served has decreased. The advertisements of the retailer remain throttled for a time period 508. After time period 508, the account balance of the retailer reaches a given level 513. At this point, the advertisement server completely stops serving advertisements for the retailer. As shown in FIG. 5, the slope of waveform 514 is substantially zero indicating that the advertisement server has stopped serving the advertisements of the retailer.

Throttling and/or stopping display of the advertisements in this manner allows the advertisement server to minimize any additional risk due to potential non-payment for additional advertisements. Throttling and/or stopping display also sends a message to the client that they have exceeded their credit line and incentivizes the client to pay the balance so that display of the advertisements is resumed.

In an embodiment, the advertisements are radio and/or video advertisements rather than Internet advertisements. With radio and/or video advertisements, the client places an order (also referred to as a commitment) to run and pay for an advertisement. Once the order has been placed, the provider may not be able to throttle the actual running of the advertisement. The provider then accepts a risk, because the client cannot be billed until confirmation that the advertisements were run (e.g., via tear sheets) is received from the advertisement publisher. This delay can be significant. So, if the risk associated with the client begins to increase, the provider may throttle the orders available to the client rather than the actual display of the advertisements.

Once the risk associated with the client decreases, the throttle may be released, or the product supply may be reinitiated if stopped completely. The decrease in risk may occur when the client has met more restrictive requirements than were previously necessary. For example, the client may be required to provide an additional guaranteed form of payment. In another example, the client may be required to operate under a billing experience more restrictive than prior to the event where the credit risk of the client increased.

Thus, in the embodiment of FIG. 5, reaching a credit line amounts to a threshold action, which results in an immediate reaction from the advertisement server. Alternatively, such dramatic shifts in the billing experience may be avoided by employing the flexible billing experience illustrated in FIG. 4. In such an embodiment, the billing experience between the retailer and the advertisement server may be updated more gradually. For example, as shown in FIG. 5, the demand for advertisements from the retailer increases sharply compared to other billing periods between May 1 and June 1. After observing this sharp increase in demand, the advertisement server may update one or more billing parameters accordingly. The advertisement server, for instance, may begin to throttle advertisements of the retailer earlier. In such a case, the advertisements of the retailer may be throttled even before the credit line is reached. The advertisement server may also lower the credit line and/or execute an ad hoc bill. Alternatively, if the increase in account balance corresponds to an increase in status of the retailer, for example, the advertisement server may increase the credit line.

Conversely, if the advertisement server observes a relatively large number of billing cycles where the retailer's demand for advertisements has remained relatively constant and/or makes other observations that indicate a relatively low risk associated with the retailer, the advertisement server may increase the credit line, decrease or eliminate ad hoc bills, and/or reduce throttling of the retailer's advertisements.

Thus through the use of periodic or event-based assessments of the risk associated with a client, a billing experience can be updated in real time. In such a billing experience, the client is, then, effectively allowed to build credit with the provider. Moreover, when billing parameters are updated in favor of the client (i.e., increase in credit limit, decrease in the frequency of billing, etc.) the client may tend to spend more on the product. Therefore, the flexible billing experience allows the provider to choose those clients that will generate the most revenue for the provider as deserving of the advantageous billing parameters, thereby maximizing revenue from reliable clients. Also, by adjusting billing parameters, the provider can manage risk associated with less reliable clients.

Moreover, adjusting billing parameters may depend on the desires of the client. For example, even if risk evaluations indicate that a credit line may be increased, the client may decide that it does not have the necessary funds to budget for such an increase. In such a case, the provider may provision the credit line so that the credit line is increased no further than the limit specified by the client.

Figure 6:
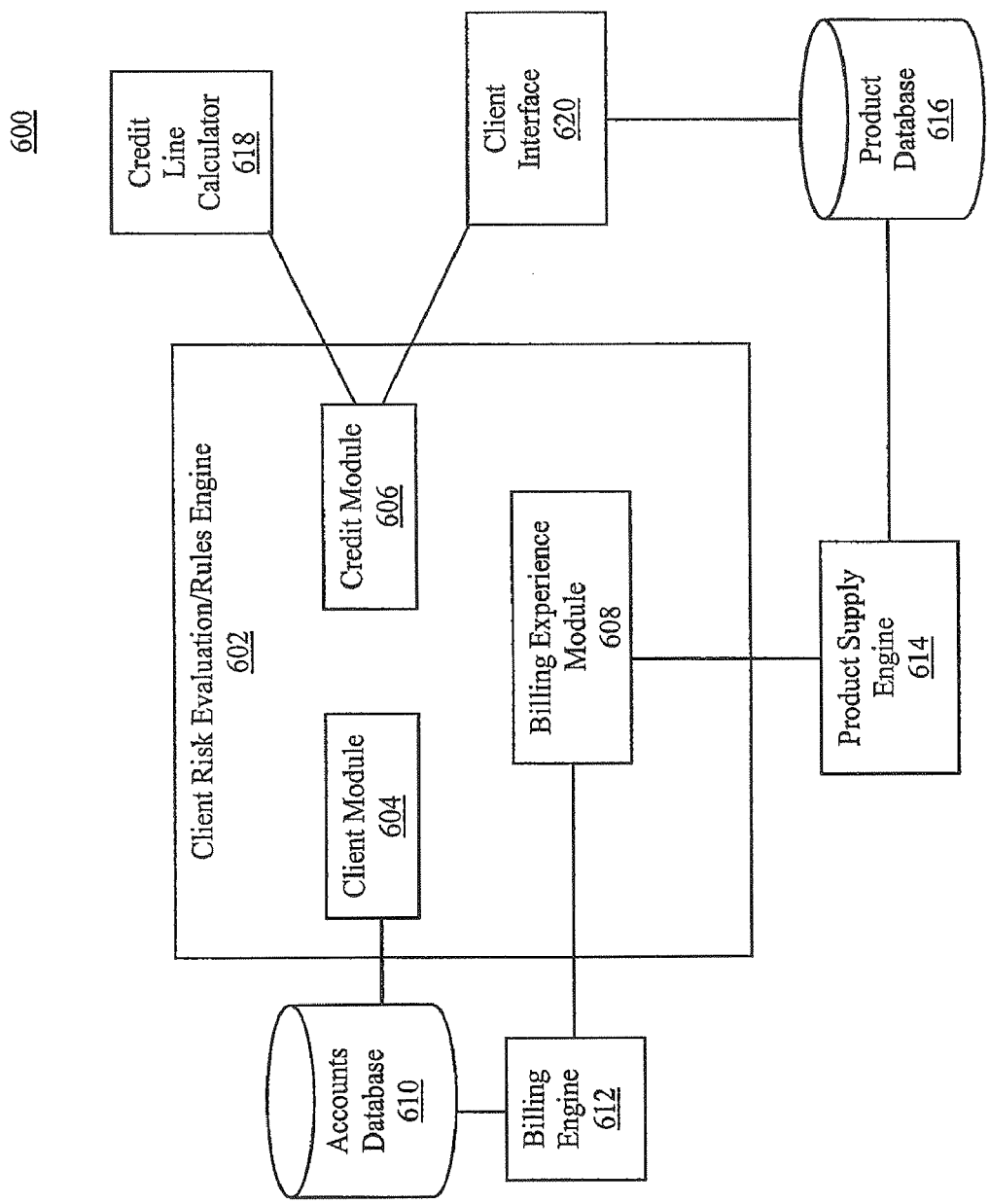
FIG. 6 shows a system for managing risk and providing products to clients, according to an embodiment of the present invention.

FIG. 6 shows a computer-implemented system 600 for managing risk exposure of a provider and providing products to a client, according to an embodiment of the present invention. System 600 includes a client risk evaluation and rules engine 602 including a client module 604, a credit module 606, and a billing experience module 608. Client module 604 is coupled to an accounts database 610 and a billing engine 612. Billing experience module 608 is coupled to billing engine 612 and a product supply engine 614. Product supply engine 614 is coupled to a product database 616. Credit module 606 is coupled to a credit line calculator 618 and a client interface 620. Client interface 620 is coupled to product database 616. The operation of system 600 will be described with reference to FIG. 7.

As would be appreciated by those skilled in the relevant art(s), each of the elements of system 600 may be implemented as a server or otherwise as hardware, software, firmware, or any combination thereof. Each element of system 600 may be coupled to other elements of system 600 through the use of a communication network such as the Internet. For example, client risk evaluation and rules engine 602 is shown conceptually to include client module 604, credit module 606, and billing experience module 608 in a single unit. However, each of client risk evaluation and rules engine 602, client module 604, credit module 606, and billing experience module 608 may be implemented a separate server and coupled together through the Internet or other communication network. Additionally or alternatively, other elements such as accounts database 610 and billing engine 612 may be implemented as separate servers and coupled together through the Internet or other communication network.

Figure 7:
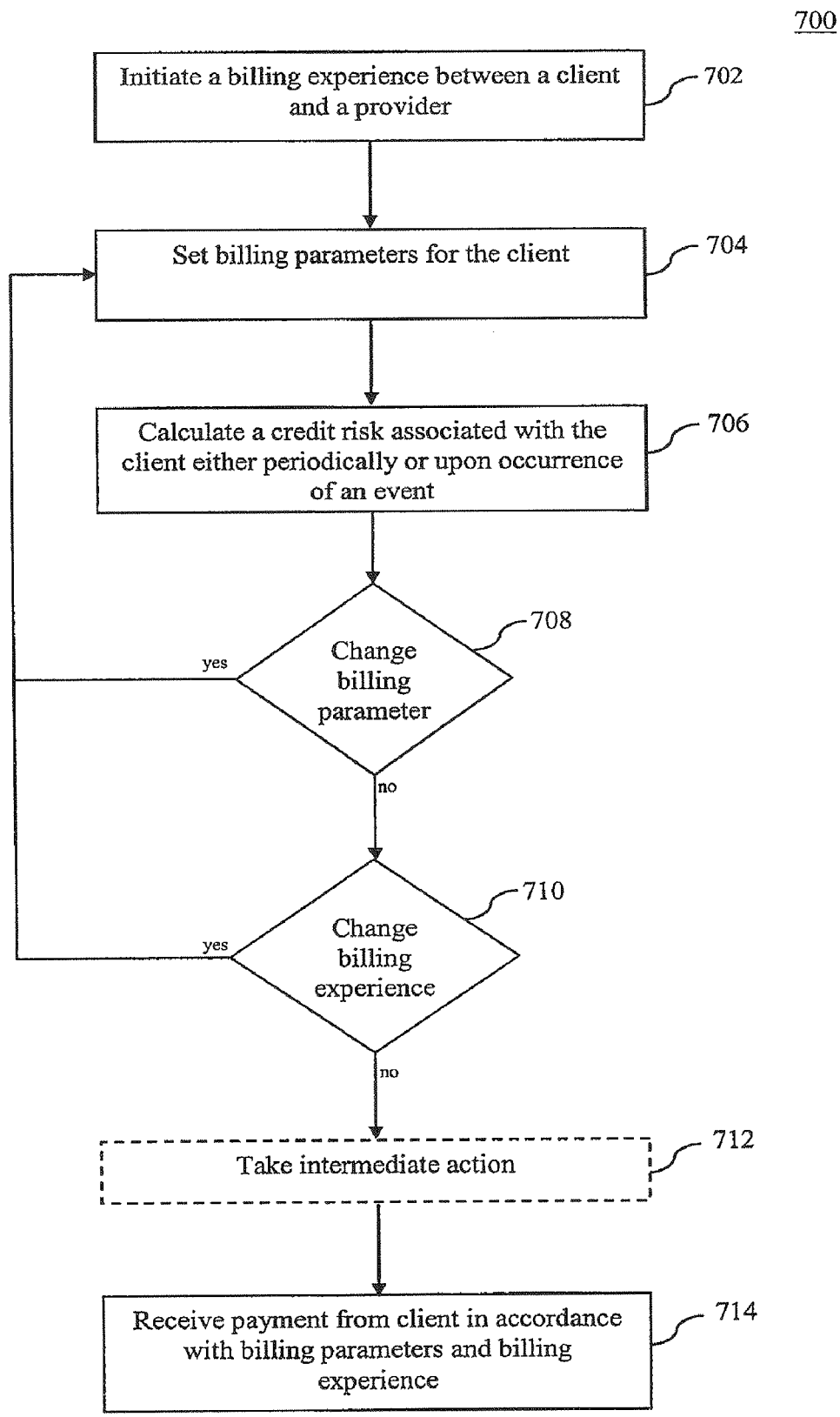
FIG. 7 shows a flowchart illustrating a method of managing risk exposure, according to an embodiment of the present invention.

As shown in FIG. 7, an exemplary method 700 for managing risk exposure of a provider is provided. As would be apparent to those skilled in the relevant art(s), such a method may be automated through the use of hardware, software, firmware, or any combination thereof. Method 700 will be described with reference to an embodiment in which the client is a retailer and the provider is an Internet advertisement server, but as described above, such a method may be applied to other scenarios. Method 700 will be described with reference to FIG. 6 but is not limited in that regard.

Method 700 begins with step 702. In step 702, a billing experience is initiated between a retailer and an advertisement server. In an embodiment, initiating the billing experience may involve establishing an account for the retailer and/or providing a product to the retailer. For example, in system 600 of FIG. 6, client module 604 may create an account for the retailer in accounts database 610. If the retailer is not a member of an existing group of members that have correlated risk (i.e., a client as described above) a new account may be established. Alternatively, if the retailer is a member of an existing group of members that have correlated risk, the retailer may be added as a member of that group. Moreover, the advertisement server may store the retailer's advertisements in product database 616. The advertisement server may serve the stored advertisements through product supply engine 614.

In step 704, billing parameters are set for the retailer. As described above, billing parameters may include a credit line. In an embodiment, the credit line may be initially set to zero so that no credit is extended to the retailer. For example, in system 600 of FIG. 6, credit module 606 may set a credit line based on a credit line calculated by credit line calculator 618. In another embodiment the advertisement server may set the cost of goods so that the product has high or low cost of goods sold. For example, billing experience module 608 may set a low cost of goods sold by reducing a syndication of the retailer's advertisements through product supply engine 614. Billing experience module 608 may increase the cost of goods sold by increasing syndication or providing video advertisements and/or print advertisements through product supply engine 614.

In step 706, a credit risk associated with the retailer is evaluated. The credit risk may be evaluated periodically and/or based on upon occurrence of an event. In an embodiment, the risk associated with the retailer is based on at least one of a review of a demand for products by the retailer, spending by the retailer with the advertisement server, and a payment history of the retailer to the advertisement server. The occurrence of an event may include, for example and without limitation, monetization, an order from a retailer, non-payment or partial payment of an invoice after a given time period, and exceeding a given fraction of the credit line by the total credit risk. For example, in system 600 of FIG. 6, client risk evaluation/rules engine 602 may evaluate the risk associated with the retailer using credit module 606. In an embodiment, the credit risk associated with the retailer may be evaluated based on a variety of criteria, such as, but not limited to, a comparison between long term and short term demand for advertisements, the presence of a guaranteed form of payment, and a payment history of the retailer, as described above.

In step 708, it is determined whether one or more billing parameters should be changed. In an embodiment, one or more billing parameters may be changed in response to the credit risk evaluated in step 706. As described above, billing parameters may include the credit line, the frequency of billing, and the cost of goods sold. In an embodiment, the credit line that the advertisement server is willing to extend to the retailer may be increased in response to a decreased risk associated with the retailer. Alternatively, the credit line that the advertisement server is willing to extend to the retailer may be decreased in response to an increased risk associated with the retailer. In system 600 of FIG. 6, billing experience module 608 may determine whether one or more billing parameters should be changed. In an embodiment, billing experience module 608 may determine that the credit line and/or frequency of billing should be changed.

In step 710, the billing experience itself may be changed. In an embodiment, changing the billing experience may include changing the billing experience from an experience having a lower credit line to a billing experience having a higher credit line. For example, changing the billing experience may include changing from a pre-pay billing experience to a partial pre-pay partial post-pay billing experience, changing a credit threshold billing experience to an end-of-term billing experience, increasing a length of a term for an end-of-term billing experience, or increasing a credit line for a credit threshold billing experience.

Alternatively, changing the billing experience may include changing the billing experience from an experience having a higher credit line to a billing experience having a lower credit line. For example, changing the billing experience may include changing from a partial pre-pay partial post-pay billing experience to a pre-pay billing experience or changing an end-of-term billing experience to a credit threshold billing experience.

In a further embodiment, billing experience module 608 may change the billing experience between the retailer and the Internet advertisement server from one that exhibits behavior similar to a pre-pay billing arrangement, and further to an experience that exhibits partial pre-pay partial post pay behavior, as described with reference to FIG. 4.

As shown by FIG. 7, if either a billing parameter or a billing experience requires changing, method 700 returns to step 704. As such, billing parameters may be kept commensurate with the determinations of steps 708 and 710. For example, a credit line may be set to be higher or lower than an initial credit line when the billing experience is changed. For example, in system 600 of FIG. 6, credit module 606 may set the credit line of the retailer to an updated level commensurate with changes in the billing experience determined by billing experience module 608. Moreover, client interface 620 may be used to request retailer approval of a change in billing parameters such as an increase in the credit line. In an embodiment where a determined credit line is higher than a credit line requested by the retailer, the credit line may be provisioned at a credit line requested by the retailer. Moreover, a cost of goods sold may be controlled. In such an embodiment, the cost of goods may be set to be high or low, based on the billing parameter changed in step 708. Product supply engine 614 may change the cost of goods sold available to the retailer. For instance, product supply engine 614 may make available or limit the availability of syndicated advertisements, video advertisements, and/or print advertisements.

In optional step 712, an intermediate action is taken. The intermediate action may include, for example and without limitation, executing an ad hoc bill or allowing the retailer to make an ad hoc payment. The retailer may be provided with an indication of the retailer's risk level and/or credit line. In an embodiment where the client includes multiple entities, such as multiple retailers, the indication may be provided to the client in such a manner that the risk correlations used to group the entities into one client is at least partially hidden from any one of the entities. Moreover, an intermediate action may involve notifying the retailer of possible changes in the billing parameters. The retailer may be notified that the advertisement server is willing to increase the credit line of the retailer and be advised that the retailer is eligible for a higher credit line. Alternatively, the retailer may be notified that the advertisement server has decreased the credit line. The credit line may be decreased below a credit line requested by the retailer. If the credit line is decreased below an account balance of the retailer, the intermediate action may further include a collection from a guaranteed form of payment to bring the account balance below the new credit line.

A retailer may also be offered a guarantee mechanism or guaranteed form of payment that will increase the credit line that the advertisement server is willing to extend to the retailer. A guaranteed form of payment may include, but is not limited to, a credit card held in reserve or a cash balance. In such an embodiment, a billing parameter (e.g., the credit line) may be changed and the general behavior of the billing experience may be retained. In a further embodiment, the guarantee mechanism may be acted on by charging a credit card held in reserve, depleting a cash balance, or initiating action on a guarantor, for example. If the guaranteed form of payment fails, the provider can react negatively and may apply this information in future credit risk calculations.

In an embodiment, the guarantee mechanism may also be removed by the provider as the risk associated with the retailer decreases. In another embodiment, the intermediate action may be a reaction taken by the provider when the client removes the guaranteed form of payment. When this happens, the provider may react by, for example and without limitation, decreasing the credit line or acting on a still-available guaranteed form of payment.

An intermediate action in step 712 may include taking action based on a change in evaluated credit risk of the retailer. For example, the rate at which the advertisement server provides products to the retailer may be reduced (i.e., throttled) or completely stopped in response to changes in the evaluated credit risk of the retailer.

In system 600 of FIG. 6, client interface 620 may be used to notify the retailer regarding a change in the credit line and/or the retailer's credit risk. Moreover, the retailer may add a guarantee mechanism via interaction with client interface 620. Billing engine 612, then, may act on the added guarantee mechanism. Additionally or alternatively, product supply engine 614 may throttle advertisements or completely stop serving advertisements of the retailer based on the credit risk evaluated by client risk evaluation/rules engine 602.

In step 714, payment is received from the retailer in accordance with the billing parameters and/or experience. For example, billing engine 612 may bill the retailer in accordance with the billing parameters. Billing engine 612 also may update accounts database 610 to indicate when the retailer has paid the bill.

Aspects of the present invention, for example method 700 or system 600 or any part(s) or function(s) thereof may be implemented using hardware, software, firmware, or a combination thereof and may be implemented in one or more computer systems or other processing systems. However, the manipulations performed by the present invention were often referred to in terms, such as adding or comparing, which are commonly associated with mental operations performed by a human operator. No such capability of a human operator is necessary, or desirable in most cases, in any of the operations described herein which form part of the present invention. Rather, the operations are machine operations. Useful machines for performing the operation of the present invention include general purpose digital computers or similar devices.

Figure 8:
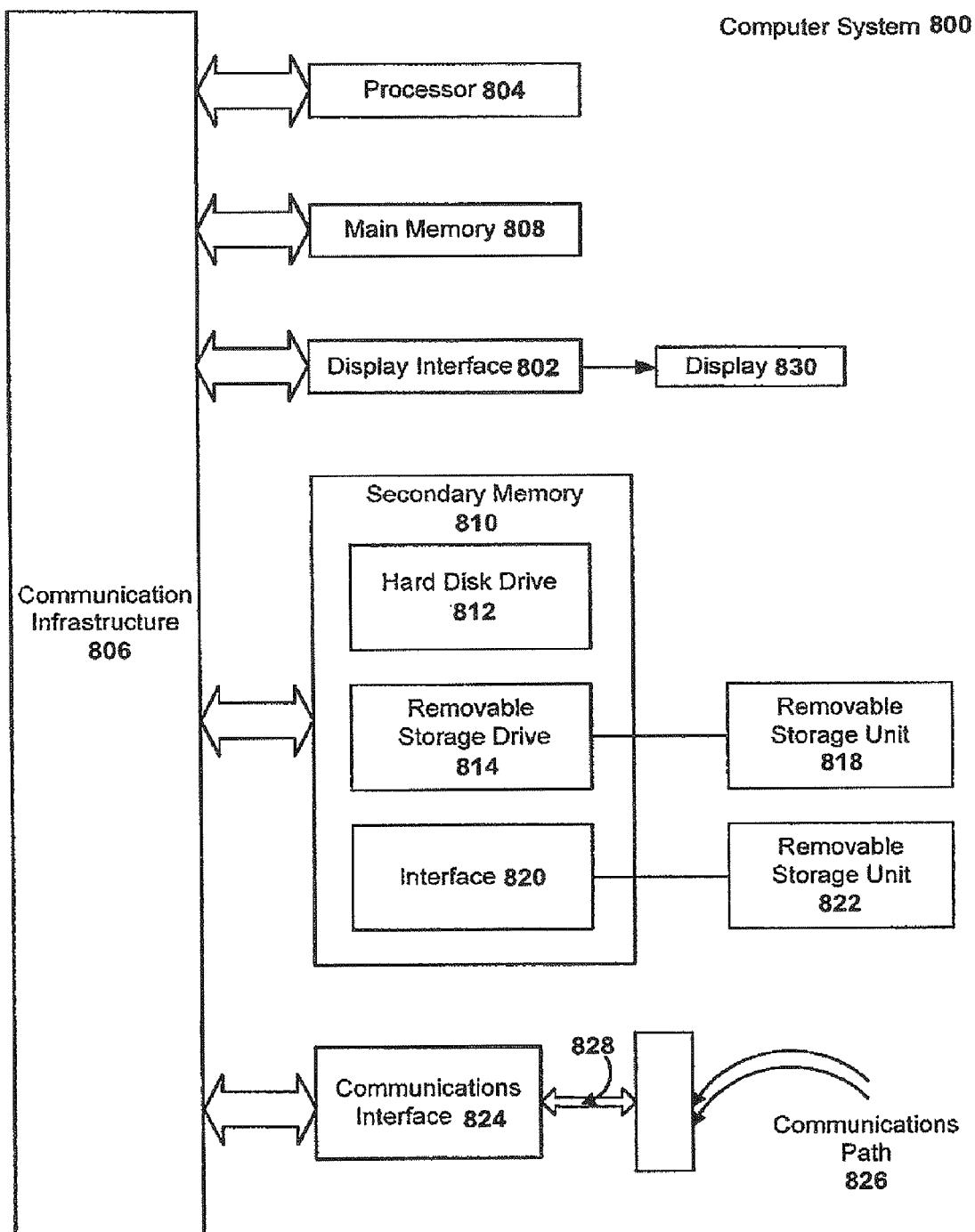
FIG. 8 is a block diagram of an exemplary computer system useful for implementing the present invention.

In fact, in one embodiment, the invention is directed toward one or more computer systems capable of carrying out the functionality described herein. An example of a computer system 800 is shown in FIG. 8.

The computer system 800 includes one or more processors, such as processor 804. The processor 804 is connected to a communication infrastructure 806 (e.g., a communications bus, cross over bar, or network). Various software embodiments are described in terms of this exemplary computer system. After reading this description, it will become apparent to a person skilled in the relevant art(s) how to implement the invention using other computer systems and/or architectures.

Computer system 800 can include a display interface 802 that forwards graphics, text, and other data from the communication infrastructure 806 (or from a frame buffer not shown) for display on the display unit 830.

Computer system 800 also includes a main memory 808, preferably random access memory (RAM), and may also include a secondary memory 810. The secondary memory 810 may include, for example, a hard disk drive 812 and/or a removable storage drive 814, representing a floppy disk drive, a magnetic tape drive, an optical disk drive, etc. The removable storage drive 814 reads from and/or writes to a removable storage unit 818 in a well known manner. Removable storage unit 818 represents a floppy disk, magnetic tape, optical disk, etc. which is read by and written to by removable storage drive 814. As will be appreciated, the removable storage unit 818 includes a computer usable storage medium having stored therein computer software and/or data.

In alternative embodiments, secondary memory 810 may include other similar devices for allowing computer programs or other instructions to be loaded into computer system 800. Such devices may include, for example, a removable storage unit 822 and an interface 820. Examples of such may include a program cartridge and cartridge interface (such as that found in video game devices), a removable memory chip (such as an erasable programmable read only memory (EPROM), or programmable read only memory (PROM)) and associated socket, and other removable storage units 822 and interfaces 820, which allow software and data to be transferred from the removable storage unit 822 to computer system 800.

Computer system 800 may also include a communications interface 824. Communications interface 824 allows software and data to be transferred between computer system 800 and external devices. Examples of communications interface 824 may include a modem, a network interface (such as an Ethernet card), a communications port, a Personal Computer Memory Card International Association (PCMCIA) slot and card, etc. Software and data transferred via communications interface 824 are in the form of signals 828 which may be electronic, electromagnetic, optical or other signals capable of being received by communications interface 824. These signals 828 are provided to communications interface 824 via a communications path (e.g., channel) 826. This channel 826 carries signals 828 and may be implemented using wire or cable, fiber optics, a telephone line, a cellular link, a radio frequency (RF) link and other communications channels.

In this document, the terms "computer program medium" and "computer usable medium" are used to generally refer to media such as removable storage drive 814 and a hard disk installed in hard disk drive 812. These computer program products provide software to computer system 800. The invention is directed to such computer program products.

Computer programs (also referred to as computer control logic) are stored in main memory 808 and/or secondary memory 810. Computer programs may also be received via communications interface 824. Such computer programs, when executed, enable the computer system 800 to perform the features of the present invention, as discussed herein. In particular, the computer programs, when executed, enable the processor 804 to perform the features of the present invention. Accordingly, such computer programs represent controllers of the computer system 800.

In an embodiment where the invention is implemented using software, the software may be stored in a computer program product and loaded into computer system 800 using removable storage drive 814, hard drive 812 or communications interface 824. The control logic (software), when executed by the processor 804, causes the processor 804 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

CONCLUSION

Exemplary embodiments of the present invention have been presented. The invention is not limited to these examples. These examples are presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the invention. Thus, the present invention should not be limited by any of the above described exemplary embodiments, but should be defined only in accordance with the following claims and their equivalents.

In addition, it should be understood that the figures illustrated in the attachments, which highlight the functionality and advantages of the present invention, are presented for example purposes only. The architecture of the present invention is sufficiently flexible and configurable, such that it may be utilized (and navigated) in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A computer-implemented method of providing advertising on behalf of a client, comprising: electronically establishing, using a computer, a billing interface for the client; electronically serving using a computer, a first set of advertisements on behalf of the client; electronically determining, using a computer, that an account balance of the client has reached a corresponding credit line, wherein the client is billed for the first set of advertisements under the billing interface;
   electronically evaluating, using a computer, a credit risk of the client based on the credit line being reached electronically modifying, using a computer, the billing interface based on the credit risk of the client; and electronically serving, using a computer, a second set of advertisements, wherein the client is billed for the second set of advertisements under the modified billing interface.

2. The computer-implemented method of claim 1, wherein evaluating a credit risk comprises evaluating at least one of a performance of advertisements, a transaction history of the client or a credit performance of the client.

3. The computer-implemented method of claim 1, wherein modifying the billing interface comprises: decreasing the credit line when the credit risk of the client increases.

4. The computer-implemented method of claim 1, wherein modifying the billing interface comprises: increasing the credit line when the credit risk of the client decreases.

5. The computer-implemented method of claim 4, wherein increasing the credit line includes changing the billing interface to at least one of the following types of billing interfaces: a partial prepay partial post-pay billing interface, a threshold billing interface, or an end-of-term billing interface.

6. The computer-implemented method of claim 1, further comprising: providing the client with an indication of at least one of the credit risk of the client or the credit line.

7. The computer-implemented method of claim 6, wherein the client includes multiple entities and the indication is provided to the client in such a manner that risk correlations used to group the multiple entities into the client is at least partially hidden from any one of the multiple entities.

8. The computer-implemented method of claim 1, wherein a rate at which the second set of advertisements are served is lower than a rate at which the first set of advertisements are served.

9. The computer-implemented method of claim 1, further comprising: ceasing service of advertisements on behalf of the client when the credit risk of the client reaches a given level.

10. The computer-implemented method of claim 1, further comprising: allowing the client to make an ad hoc payment for at least one of the first set of advertisements and the second set of advertisements.

11. A system for providing advertising opportunities on behalf of a client, comprising: a risk evaluation server configured such that when an account balance of the client reaches a corresponding credit line, the risk evaluation server evaluates a risk of the client based on the account balance reaching the corresponding, credit line and on at least one of a performance of the product of the client, a transaction history of the client, or a credit performance of the client; a billing server configured to modify, based on the evaluated credit risk, a billing interface for the client to one of the following billing interfaces: a prepay billing interface; a partial prepay partial postpay billing interface; a threshold billing interface; or an end-of-term billing interface, wherein the billing server further bills the client at a time determined by the billing interface; and an advertisement supply server configured to serve advertisements on behalf of the client, wherein the biller is configured to bill the client, for serving, the advertisements under the modified billing interface.

* * * * *

UNITED STATES PATENT AND TRADEMARK OFFICE
CERTIFICATE OF CORRECTION

PATENT NO.       : 8,027,915 B2                                   Page 1 of 2
APPLICATION NO.  : 12/851902
DATED            : September 27, 2011
INVENTOR(S)      : Koningstein et al.

It is certified that error appears in the above-identified patent and that said Letters Patent is hereby corrected as shown below:

In the Claims

Column 16, line 28, Claim 1, please insert a line break between the words "comprising:" and "electronically establishing".

Column 16, line 29, Claim 1, please insert a line break between the words "client;" and "electronically serving".

Column 16, line 31, Claim 1, please insert a line break between the words "client," and "electronically determining".

Column 16, line 38, Claim 1, please delete "reached" and insert --reached;--.

Column 16, line 38, Claim 1, please insert a line break between the words "reached;" and "electronically modifying".

Column 16, line 40, Claim 1, please insert a line break between the words "and" and "electronically serving".

Column 16, line 48, Claim 2, please insert a --,-- after the word "or.".

Column 16, line 50, Claim 3, please insert a line break between the words "comprises:" and "decreasing".

Column 16, line 53, Claim 4, please insert a line break between the words "comprises:" and "increasing".

Column 16, line 61, Claim 6, please insert a line break between the words "comprising:" and "providing the client".

Signed and Sealed this
Eighteenth Day of March, 2014

Michelle K. Lee
*Deputy Director of the United States Patent and Trademark Office*

CERTIFICATE OF CORRECTION (continued)
U.S. Pat. No. 8,027,915 B2

Column 17, line 10, Claim 10, please insert a line break between the words "comprising:" and "allowing the client".

Column 17, line 14, Claim 11, please insert a line break between the words "comprising:" and "a risk evaluation".

Column 18, line 2, Claim 11, please delete "the corresponding, credit line" and insert --the corresponding credit line--.

Column 18, line 4, Claim 11, please insert a line break between the words "client;" and "a billing server.".

Column 18, line 11, Claim 11, please insert a line break between the words "and" and "an advertisement".

Column 18, line 13, Claim 11, please delete ", for serving," and insert --for serving--.